L. BLESSING & A. JOHNS.
NUT LOCK.
APPLICATION FILED APR. 10, 1909.
975,115.
Patented Nov. 8, 1910.
Fig. 1
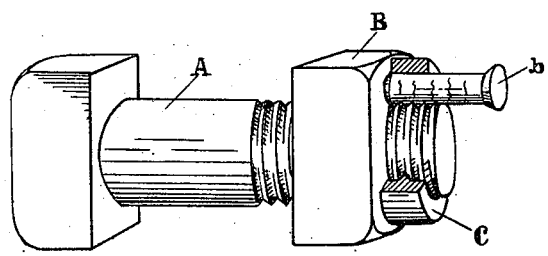
Fig. 2
Fig. 3
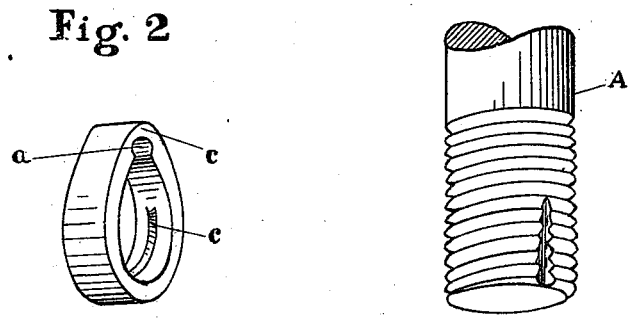
WITNESSES:
INVENTORS
LOUIS BLESSING
ALFRED JOHNS
BY
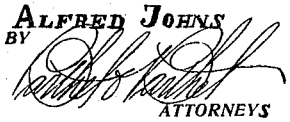
ATTORNEYS

UNITED STATES PATENT OFFICE.

LOUIS BLESSING AND ALFRED JOHNS, OF JACKSON, MICHIGAN.

NUT-LOCK.

975,115.  Specification of Letters Patent.  Patented Nov. 8, 1910.

Application filed April 10, 1909.  Serial No. 489,040.

*To all whom it may concern:*

Be it known that we, LOUIS BLESSING and ALFRED JOHNS, citizens of the United States of America, residing at Jackson, in the county of Jackson and State of Michigan, have invented certain new and useful Improvements in Nut-Locks, of which the following is a specification, reference being had therein to the accompanying drawings.

This invention relates to that kind of nut lock in which the screw bolt has a holding nut and a locking nut, the locking nut preventing the holding nut from accidentally unscrewing but leaving it wholly free to be tightened and the invention consists in the novel construction and arrangement of the parts all as more fully hereinafter described and shown in the accompanying drawings, in which:—

Figure 1 is a view in perspective, partially broken away, of a bolt provided with a nut lock embodying features of the invention. Fig. 2 is a view in detail of the nut-lock. Fig. 3 is a perspective view of the threaded end of the bolt showing a slightly modified form of construction.

A is the bolt and B the holding nut, both of which are of the ordinary description. In connection with this holding nut a locking nut C is used, provided with a segmental thread $c$ or V-flange adapted to engage the bolt thread, and has an interior keyway $a$ adapted to receive a locking key $b$. The nut is substantially cylindrical with a lug $c^1$ thereon for obtaining proper cross-sectional strength around the keyway. It is designed to slip over the bolt thread without turning until against the holding nut.

The locking key fits the keyway in the locking nut and is adapted to draw the thread of the nut lock into mesh with the threads of the bolt when driven home after the nut is screwed onto the bolt, and the nut lock pushed on, thereby locking the nut in position.

In operation, the holding nut is first engaged with the bolt and is screwed home and tightened, then the locking nut is slipped over the bolt and against the holding nut. The locking key is driven into the keyway of the locking nut till it is brought up against the holding nut and cannot be driven any farther, thereby drawing the segmental flange into mesh with the bolt thread. In this way the holding nut is held by the key from unscrewing accidentally while at the same time it can be tightened in the usual way, all that is required after tightening it is to give the key a few taps with the hammer to drive it up against the nut.

The nut lock is particularly adapted for cases where special conditions require a frequent tightening of the holding nut and to facilitate this use the end of the key is left to project more or less from the face of the locking nut.

There is an advantage in having the locking nut formed with a single segmental thread as it may be cast in malleable iron or like material, thus materially reducing the cost of production, especially in large quantities.

The key may be slightly tapering to permit of its being driven in and cut its way through the threads of the bolt, or an initial key way may be provided for in the end of the bolt as shown in Fig. 3; it is also within the scope of our invention to use keys of different cross-sections with keyways of corresponding shape and instead of one keyway the nut may be provided with a plurality.

What we claim as our invention is:—

In a nut lock, the combination with a bolt of a holding nut, a nut lock having a central aperture adapted to pass freely over the bolt end with an interior segmental flange adapted to mesh with the bolt thread and a key way opposite the flange, and a locking key longitudinally movable in the nut lock and in a mating key way in the screw-threaded portion of the bolt adapted to hold the flange in mesh with the bolt threads, extending through the locking nut inwardly into contact with the face of the holding nut and engaging with the threads of the bolt to resist endwise displacement of the holding nut.

In testimony whereof we affix our signatures in presence of two witnesses.

LOUIS BLESSING.
ALFRED JOHNS.

Witnesses:
CHAS. M. SPINNING,
BENJAMIN J. GLASEPONT.